US012809619B2

(12) United States Patent
Stapleton

(10) Patent No.: US 12,809,619 B2
(45) Date of Patent: Nov. 24, 2026

(54) CODE-SIGN CHAIN OF CUSTODY (CSCC)

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Franciso, CA (US)

( * ) Notice: Subject to any disclaimer, the term of this patent is extended or adjusted under 35 U.S.C. 154(b) by 834 days.

(21) Appl. No.: 18/128,731

(22) Filed: Mar. 30, 2023

(65) Prior Publication Data

US 2024/0329978 A1 Oct. 3, 2024

(51) Int. Cl.
*G06F 8/71* (2018.01)
*H04L 9/00* (2022.01)
*H04L 9/32* (2006.01)

(52) U.S. Cl.
CPC .............. *G06F 8/71* (2013.01); *H04L 9/3247* (2013.01); *H04L 9/3263* (2013.01); *H04L 9/50* (2022.05)

(58) Field of Classification Search
CPC . G06F 8/71; H04L 9/50; H04L 9/3247; H04L 9/3263
See application file for complete search history.

(56) References Cited

U.S. PATENT DOCUMENTS

| | | | | |
|---|---|---|---|---|
| 11,012,242 | B1 * | 5/2021 | Griffin | H04L 9/50 |
| 2019/0303623 | A1 * | 10/2019 | Reddy | G06F 8/71 |
| 2020/0073657 | A1 * | 3/2020 | Robison | G06F 21/57 |
| 2020/0177397 | A1 * | 6/2020 | Harrington | H04L 9/3297 |
| 2023/0040803 | A1 * | 2/2023 | Landman | G06F 8/60 |

OTHER PUBLICATIONS

Farooq, Muhammad Shoaib, et al. "A blockchain-based framework for distributed agile software development." IEEE Access 10 (2022): 17977-17995. Retrieved fromt he Internet: URL<https://ieeexplore.ieee.org/stamp/stamp.jsp?tp=&arnumber=9694597> (Year: 2022).*
Bankar, Sandip, and Deven Shah. "Blockchain based framework for Software Development using DevOps." 2021 4th Biennial International Conference on Nascent Technologies in Engineering (ICNTE). IEEE, 2021. Retrieved from the Internet: URL<https://ieeexplore.ieee.org/stamp/stamp.jsp?tp=&arnumber=9487760?> (Year: 2021).*

* cited by examiner

*Primary Examiner* — S. Sough
*Assistant Examiner* — Cheneca Smith
(74) *Attorney, Agent, or Firm* — Foley & Lardner LLP

(57) ABSTRACT

The present disclosure is directed to systems, methods, and non-transitory computer-readable media including adding first block to a blockchain in response to signing first code by a first system and adding second block to the blockchain in response to signing second code by second system, the second code is different from the first code. The first block includes a first time indicator. The second block includes a second time indicator.

17 Claims, 4 Drawing Sheets

CODE-SIGN CHAIN OF CUSTODY (CSCC)

BACKGROUND

Computer applications or products are programmed using computer codes. To verify the integrity of computer codes, the computer codes can be hashed, and a digital signature can be generated using a private key over the hashed code. A hashed code refers to a hash of the code. The input parameters to the digital signature algorithm include the private key and the hash of the code. The corresponding public key included in a certificate issued from a trusted Certificate Authority (CA) can be used to verify the digital signature of the code. The public key certificate is validated before the public key contained therein is trusted for the verifying the digital signature. The public key certificate is validated using certificate chain validation. However, the public key certificate may expire at a time when the code remains legitimate. This causes a mismatch between the actual integrity of the code and the validation mechanism. Therefore, conventional, code-sign mechanisms also rely on an untrustworthy timestamp. Furthermore, conventional, code-sign mechanisms do not provide a chain-of-custody and cannot manage multiple sources with numerous PKI certificate chains.

SUMMARY

The arrangements disclosed herein relate to systems, methods, non-transitory computer-readable media, apparatuses for adding a first block to a blockchain in response to signing a first code by a first system, wherein the first block comprises a first time indicator, and adding a second block to the blockchain in response to signing a second code by a second system, wherein the second block comprises a second time indicator, wherein the second code is different from the first code.

These and other features, together with the organization and manner of operation thereof, will become apparent from the following detailed description when taken in conjunction with the accompanying drawings.

DETAILED DESCRIPTION

Figure 1:
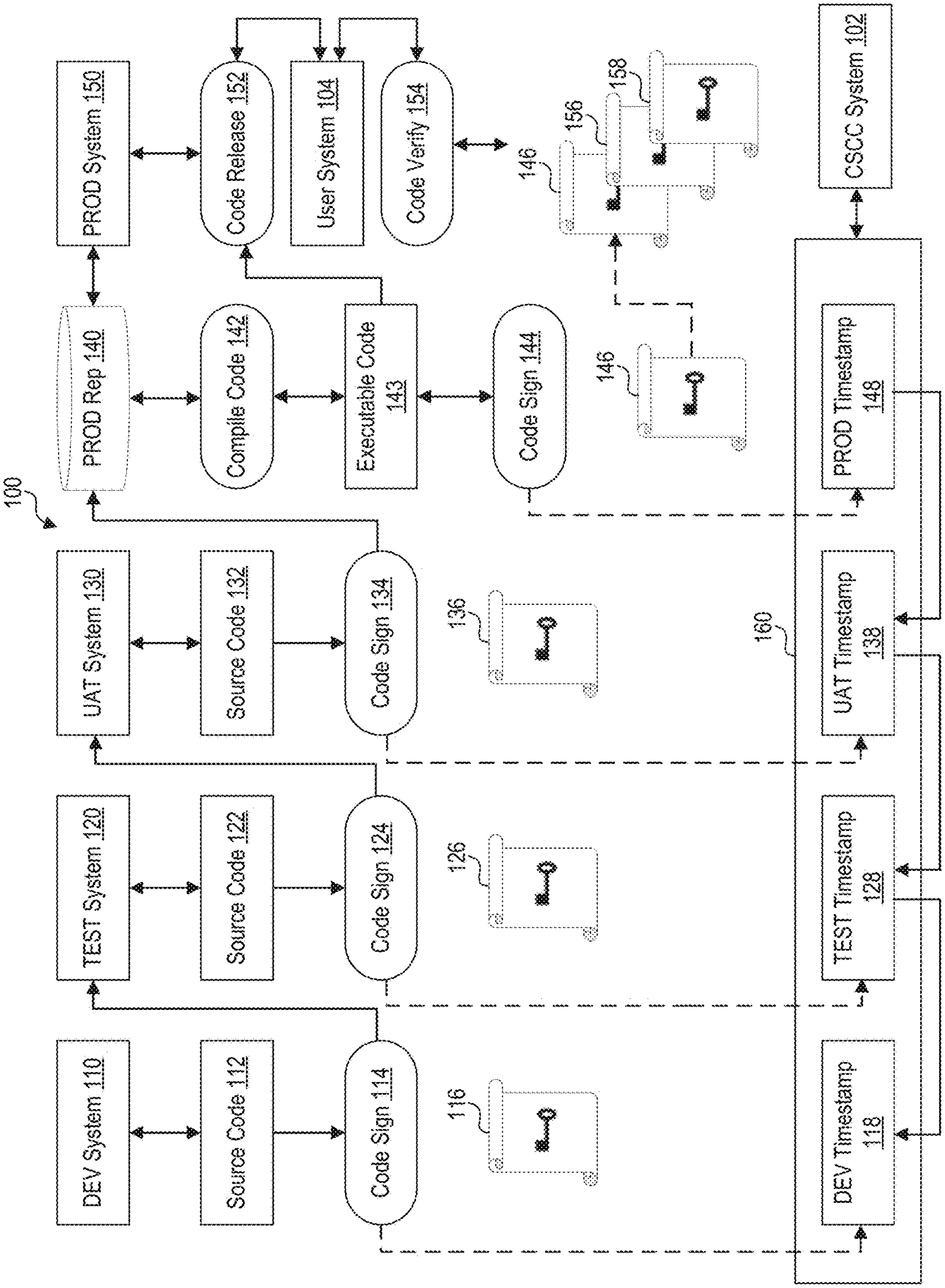
FIG. 1 is a system configured for providing Code-Sign Chain of Custody (CSCC), according to various arrangements.

In some examples, a code to-be-signed (e.g., readable source code, the compiled executable code, or so on) is hashed, and then an asymmetric private key is used with the hash to create a digital signature over the code. The code is authenticated by using the corresponding asymmetric public key to verify the digital signature. The public key is encapsulated in a certificate (e.g., an X.509 public key certificate), issued from a trusted CA. The certificate is validated before its public key can be trusted to authenticate the code. The CA can be a private Public Key Infrastructure (PKI) (e.g., for a given entity or company) or a public PKI (e.g., DigiCert).

A product can include code sets that have been signed using various PKIs. That is, a product can include various code sets or objects, each of which may be signed by a different entity that can be verified using a different CA/PKI. Thus, the different PKI certificate chains for the code sets need to be accessible. The various PKI certificate chains needed for each code signature can be managed using a Code Sign White List (CSWL).

A public key certificate may expire before the corresponding signed code has been decommissioned. Even when the code-signing includes a timestamp, there is no guarantee when the code was actually signed. In a scenario, the code is signed on Feb. 1, 2020, and the code-sign certificate is issued Feb. 1, 2019 with a 2-year validity (assume 731 days allowing for 2020 being a leap year). The code-sign certificate expires on Feb. 1, 2021 at midnight. But on the Morning of Feb. 2, 2021, the signature on the signed code would fail because the certificate is no longer valid, having expired a few hours earlier. Even in the scenario in which the code was valid when it was signed on Feb. 1, 2020 and remains valid on Feb. 2, 2021, a bad actor can compromise the system if, on Feb. 5, 2021, the bad actor gains access to the certificate and the private key, modifies the legitimate code with malware, changes the bad actor's local system clock to Feb. 1, 2020, and signs the illegitimate code. In this scenario, although illegitimate code has been injected onto an unsuspecting system, the malware would appear to be valid as it has been signed when the certificate was apparently "valid" and when the signer still had control over the private signature key. Thus, on Feb. 5, 2021 the malware compromises the system because the code-sign was assumed valid. Even in the scenario in which the code was valid when it was signed on Feb. 1, 2020 and remains valid on Feb. 2, 2021, the digital signature does not include a date. Further, even if the signed code includes a date, there is no guarantee that the signer and the verifier are using accurate or synchronized clocks. In another scenario involving a Registration Authority (RA) compromise, while the CA keys were never compromised, the passwords to the RA were stolen, and counterfeit certificates were issued to attackers masquerading as legitimate code manufacturers.

The arrangements described herein relate to systems, methods, non-transitory computer-readable media, and apparatuses for using a sequence of code-sign events and a code-sign blockchain to provide and document chain-of-custody of computer codes. Each step or stage in the development process uses code-sign to protect and preserve code integrity, promoting the code from lower to higher environments. Each step or stage in the development process adds information about the code to a blockchain, tracking history for ongoing and subsequent audits of the code.

In some arrangement, an environment for developing, testing, and producing codes is system and/or process in which an input code is modified through writing, programming, testing, and so on, go generate an output code. In an environment, through suitable access control, one or more computing systems and one or more operators (e.g., coders, developers, testers, administrators, and so on) can have access to the input code to perform the writing, programming, testing, and modifying the input code. In some examples, at least one computing system or at least one operator in a first environment is disallowed access to a second environment. In some examples, at least one computing system or at least one operator in a first environment is allowed access to a second environment. The output code of an environment is checked in to the next environment. Accordingly, each environment outputs or is associated with a different version or variation of the code for a computer program or product. In some examples, the output code of an environment can be code signed by an entity associated with that environment.

In some arrangements, four environments for developing, testing, and producing codes include Development (DEV), Test (e.g., System Integration Test (SIT)), User Acceptance Test (UAT), and Production (PROD). DEV is an environment in which software developers and coders write and develop the code to an application. DEV is the lowest level environment with the fewest controls, and without production data. Test is an environment in which test programs are written by the developers and coders to test the codes written in DEV. Test is the next-level environment with more controls, closer to PROD and without production data. In UAT, the code that has completed the testing under Test is sent to another entity for testing. UAT is the next-level environment with additional controls for user acceptance testing, and may allow some production data. In PROD, the code that has completed the testing under UAT is sent to end users or the public for use and issue reporting. PROD is the highest-level environment with the most controls and includes both a code repository for final compilation and the production systems in which the executable code is deployed.

Figure 2:
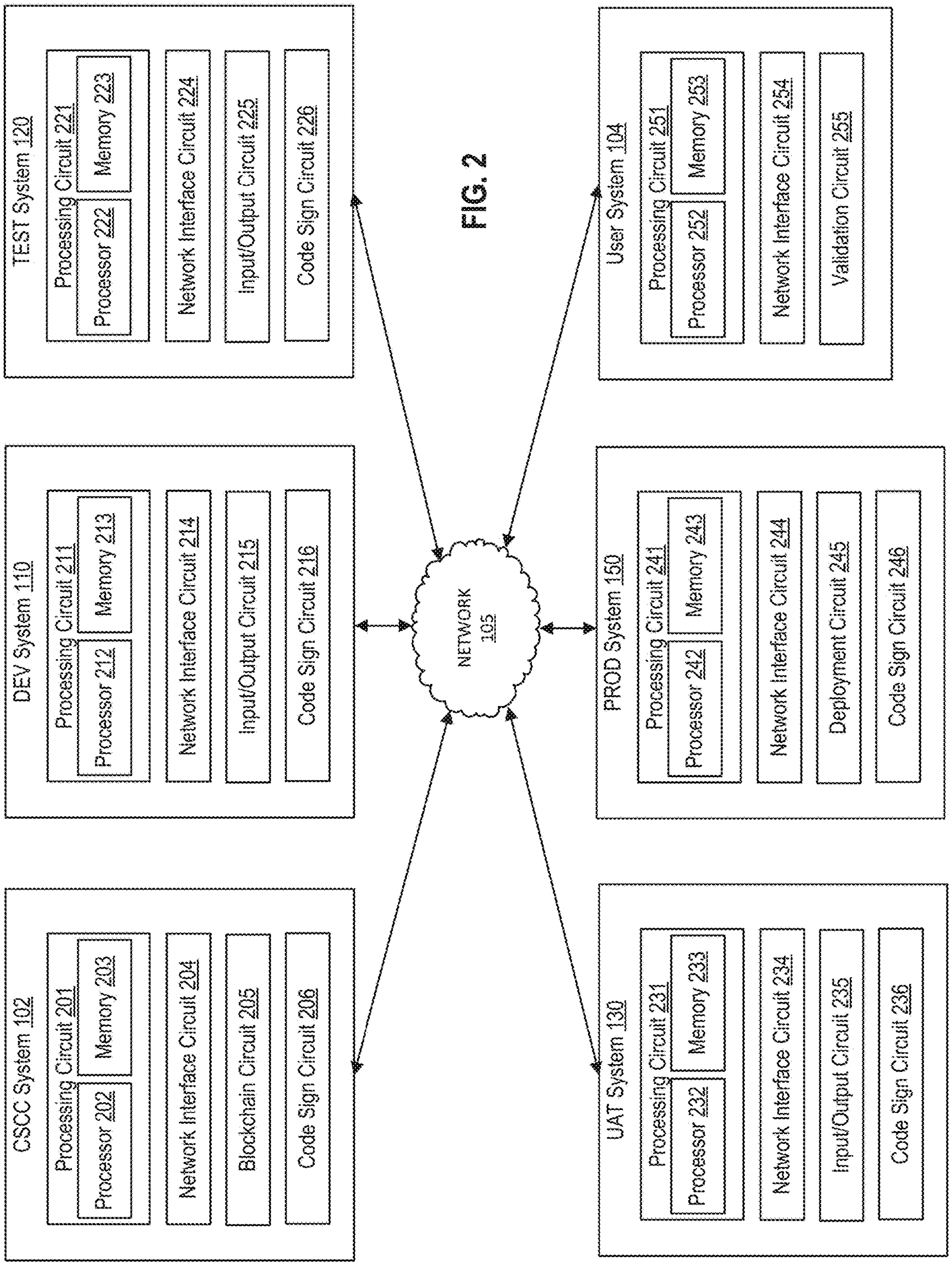
FIG. 2 includes block diagrams illustrating examples of the CSCC system, the user system, a Development (DEV) system, a TEST system, a User Acceptance Test (UAT) system, and a Production (PROD) system, according to various arrangements.

FIG. 1 is a system 100 configured for providing Code-Sign Chain of Custody (CSCC), according to various arrangements. The system 100 includes a CSCC system 102, a user system 104, a DEV system 110, a TEST system 120, a UAT system 130, and a PROD system 150. The DEV system 110 provides or is associated with the DEV environment. The TEST system 120 provides or is associated with the TEST environment. The UAT system 130 provides or is associated with the UAT environment. The PROD system 150 provides or is associated with the PROD environment. The CSCC system 102 generates and updates a CSCC blockchain 160. FIG. 2 include block diagrams illustrating examples of the CSCC system 102, the user system 104, the DEV system 110, the TEST system 120, the UAT system 130, and the PROD system 150.

In some arrangements, each of the CSCC system 102, the user system 104, the DEV system 110, the TEST system 120, the UAT system 130, and the PROD system 150 includes a respective processing circuit 201, 211, 221, 231, 241, or 251, having a respective processor 202, 212, 222, 232, 242, or 252 and a respective memory 203, 213, 223, 233, 242, or 253. Each processor 202, 212, 222, 232, 242, or 252 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. Each memory 203, 213, 223, 233, 242, or 253 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, each memory 203, 213, 223, 233, 242, or 253 includes tangible, non-transient volatile memory or non-volatile memory. Accordingly, each memory 203, 213, 223, 233, 242, or 253 includes database components, object code components, script components, or any other type of information structure for supporting the various activities and information structures described herein. Each processing circuit 201, 211, 221, 231, 241, or 251 can be used to implemented respective ones of the circuits 204, 205, 206, 214, 215, 216, 224, 225, 226, 234, 235, 236, 244, 245, 256, 254, or 255.

In some arrangements, each of the CSCC system 102, the user system 104, the DEV system 110, the TEST system 120, the UAT system 130, and the PROD system 150 includes a respective network interface circuit 204, 214, 224, 234, 244, or 254. The network interface circuits 204, 214, 224, 234, 244, and 254 can implemented using respective ones of the processing circuits 201, 211, 221, 231, 241, and 251. Each of the network interface circuit 204, 214, 224, 234, 244, or 254 is configured for and structured to establish a connection over the network 105, and allow data, information, messages, and on to be exchanged among the CSCC system 102, the user system 104, the DEV system 110, the TEST system 120, the UAT system 130, the PROD system 150, and another suitable entity such as the Time Stamp Authority (TSA) over the network 105. Accordingly, each network interface circuit 204, 214, 224, 234, 244, or 254 is structured for sending and receiving data over a communication network (e.g., the network 105). Accordingly, each network interface circuit 204, 214, 224, 234, 244, or 254 includes any of a cellular transceiver (for cellular standards), wireless network transceiver (for 802.11X, ZigBee, Bluetooth, Wi-Fi, or the like), wired network interface, or a combination thereof. For example, each network interface circuit 204, 214, 224, 234, 244, or 254 may include wireless or wired network modems, ports, baseband processors, and associated software and firmware.

In some arrangements, each of the DEV system 110, the TEST system 120, and the UAT system 130 includes a respective input/output circuit 215, 225, or 235. Each of the input/output circuits 215, 225, and 235 are configured to receive input from and provide information to an operator of a respective one of the DEV system 110, the TEST system 120, the UAT system 130. Each of the input/output circuits 215, 225, and 235 includes an input device such as a touchscreen, keyboard, mouse, microphone, joystick, track ball, light pen, camera, and so on. Each of the input/output circuits 215, 225, and 235 includes an output device such as a screen, monitor, speakers, printers, and so on. Each of the input/output circuits 215, 225, and 235 includes any combination of hardware components, communication circuitry connecting the hardware components to a respective one of the processing circuits 211, 221, 231, and machine-readable media (e.g., software or firmware) for controlling the hardware components.

The DEV system 110 is operated by a coder or a developer to generate (e.g., write) and test the source code 112 in the DEV environment. For example, the coder can use the input/output circuit 215 to input (e.g., write) the source code 112. Examples of the source code 112 can include readable source code such as C, C++, Python, HTML, SQL languages, Java, and so on. In response to completing the source code 112 (to be signed), the source code 112 is submitted to the next environment and system, namely the TEST system 120. The source code 112 (to be signed) is signed by the coder or developer associated with the DEV system 110 or by the DEV system 110.

For example, the source code 112 is run through a code sign function 114 to generate the signed source code 112. The code sign function 114 can be implemented using the code sign circuit 216 or by a central system, such as the code sign circuit 206 of the CSCC system 102. The code sign function 114 includes hashing the source code 112 and signing the hashed source code 112 using an asymmetric private key of the DEV system 110. Thus, a digital signature associated with the DEV system 110 or the DEV environment can be created over the hash of the source code 112 to be signed. The DEV system 110 provides the signed source code 112 to the TEST system 120 for testing and modification. In some examples, the DEV system 110 can send the signed source code 112 via the network 105 to the TEST system 120. In some examples, the DEV system 110 can send a link (e.g., a Uniform Resource Locator (URL), a Uniform Resource Identifier (URI), Uniform Resource Name (URN), or another suitable identifier) of the signed source code 112 via the network 105 to the TEST system 120, where the link indicates a location where the signed source code 112 is stored (e.g., in a database, a site, a server, or the cloud). The DEV system 110 can check the signed source code 112 into the TEST system 120 by sending an indicator or flag along with the signed source code 112 indicating that the source code 112 is ready for testing by the TEST system 120.

In response to at least one of: determining that the source code 112 is ready to be code-signed, determining that developing the source code 112 in the DEV environment is completed, triggering the code-sign function 114, completing the code sign function 114, checking the signed source code 112 into the TEST system 120, or providing the signed source code 112 to the TEST system 120, a DEV timestamp event is triggered. In the DEV timestamp event, a DEV timestamp 118 is generated to correspond to the signed source code 112 exiting the DEV system 110 and/or entering the TEST system 120. The CSCC system 102 (e.g., the blockchain circuit 205) can add the DEV timestamp 118 onto a CSCC blockchain 160. The blockchain circuit 205 can be implemented by the processing circuit 201 and can manage the CSCC blockchain 160. For example, the blockchain circuit 205 can add a block to the blockchain or allow an authorized device (e.g., the user device 104) to read information from one or more blocks of the blockchain 160 for verification of the timestamps and signatures, as described herein.

In some arrangements, the DEV timestamp 118 is a trusted timestamp such as a Time Stamp Token (TST). In some arrangements, a requestor (e.g., the DEV system 110, the CSCC system 102, or another suitable device or system) sends a hash of the source code 112 to a TSA and receives the TST for the source code 112 from the TSA. The source code 112 to be hashed can include the source code 112 without the signature of the DEV system 110, referred to as the source code 112 to be signed, in some examples. That is, the source code 112 without the signature of the DEV system 110 is hashed for generating the DEV timestamp 118. In other examples, the source code 112 to be hashed can include the source code 112 with the signature of the DEV system 110 to provide code integrity and authenticity provable to a trusted time. That is, the source code 112 with the signature of the DEV system 110 is hashed for generating the DEV timestamp 118. The requestor can send to the TSA the hash of the source code 112 (signed or unsigned) or a link to the hash of the source code 112 (signed or unsigned) that is stored in a database, a site, a server, or the cloud. In the examples in which the DEV system 110 (e.g., the requestor) receives the DEV timestamp 118 (e.g., the TST) from the TSA, the DEV system 110 sends the DEV timestamp 118 to the CSCC system 102 for including in the blockchain 160. In some examples in which the CSCC system 102 is the requestor, the CSCC system 102 receives the DEV timestamp 118 (e.g., the TST) from the TSA directly.

The requestor can send the hash of the source code 112 (without the signature of the DEV system 110) in response to at least one of: determining that the source code 112 is ready to be code-signed, determining that developing the source code 112 in the DEV environment is completed, triggering the code-sign function 114, completing the code sign function 114, checking the signed source code 112 into the TEST system 120, or providing the signed source code 112 to the TEST system 120. The requestor can send the hash of the source code 112 (with the signature of the DEV system 110) in response to at least one of: completing the code sign function 114, checking the signed source code 112 into the TEST system 120, or providing the signed source code 112 to the TEST system 120.

The TSA can generate the TST by running the hashed source code 112 (with or without the signature of the DEV system 110) through a TST function. The TSA may not have access to the original source code 112. The TST function can create a TST by appending a timestamp from a calibrated clock to the hashed source code 112 and generating a cryptographic signature, such as a digital signature, a MAC, an HMAC, or a hash chain over the timestamp appended to the hashed source code 112. The cryptographic signature can be verified by a relying party to determine integrity provable to a trusted time indicated by the TST. In some examples, the TST can be generated using one or more TST mechanisms including 1) Digital Signature Method, 2) MAC Method, 3) Linked Token Method, 4) Linked and Signed Method, and 5) Transient Key Method. Linked Token Method uses a MAC for the TST cryptographic signature while the Linked and Signed Method uses a digital signature for the TST cryptographic signature. Both methods create a chain of TST linked together using a hash algorithm. The Transient Key Method uses Elliptic Curve Digital Signature Algorithm (ECDSA) to sign each TST and changes the signature key on a regular interval and manages the ECDSA signature keys using an internal key chain.

ANSI X9.95 defines requirements and methodologies for a TSA to issue a TST. Unlike legacy timestamps which rely on synchronized clocks, TSA use calibrated clocks aligned with a National Measurement Institutes (NMI) and the International Time Authority (ITA). The Bureau International des Poids et Mesures (BIPM) near Paris, France is the official ITA that calibrates the clocks of each NMI. The two NMI in the USA is the NIST Time and Frequency Division that manages the F1 Cesium Fountain Atomic Clock and the United States Naval Observatory (USNO) which manages the Global Positioning System (GPS).

The TEST system 120 is operated by a tester to compile the source code 112, test the source code 112, and modify the source code 112 based on the test rest results. The tests performed by the TEST system 120 may have at least one parameter be defined by the tester (e.g., using the input/output circuit 225). In some examples, the tests performed by the TEST system 120 can be using software automated (e.g., an automated regression tests) or based on Artificial Intelligence (AI). The modified version of the source code 112 in the TEST system 120 is referred to as source code 122, which may be a second version or variation of the source code 112.

The TEST system 120 can validate the signed source code 112 outputted by or received from the DEV system 110. The signed source code 112 is authenticated by rehashing the source code 112 and using the corresponding asymmetric public key of the DEV system 110 (or an operator thereof) to verify the digital signature over the signed source code 112. The public key is encapsulated in a certificate 116 (e.g., an X.509 public key certificate) of the DEV system 110 (or an operator thereof), issued from a trusted CA. The certificate 116 is validated (e.g., using public key certificate chain validation) before its public key can be trusted to authenticate the signature on the signed source code 112. The CA can be a private PKI (e.g., for a given entity or company) or a public PKI (e.g., DigiCert). The certificate chain of the certificate 116 can include at least the certificate 116, the CA certificate, and the root certificate. In response to validating the certificate 116, the public key included in the certificate 116 can be used to verify the signature over the signed source code 112. In response to verifying the signature over the signed source code 112, the source code 112 can be used as input code to the TEST system 120, which compiles the source code 112 and tests the source code 112 in a test environment. Based on the results of the test, the source code 122 is generated by the TEST system 120. For example, the tester can use the input/output circuit 225 to input (e.g., write) modifications of the source code 112 to generate the source code 122 based on the test results (e.g., bugs found, debugging, and so on).

In response to generating the source code 122, the source code 122 is submitted to the next environment and system, namely the UAT system 130. The source code 122 is signed by the tester associated with the TEST system 120. For example, the source code 122 is run through a code sign function 124 to generate the signed source code 122. The code sign function 124 can be implemented using the code sign circuit 226 or by a central system, such as the code sign circuit 206 of the CSCC system 102. The code sign function 124 includes hashing the source code 122 and signing the hashed source code 122 using an asymmetric private key of the TEST system 120 or an operator thereof. Thus, a digital signature associated with the TEST system 120 or the TEST environment can be created over the hash of the source code 122. The TEST system 120 provides the signed source code 122 to the UAT system 130 for testing and modification. In some examples, the TEST system 120 can send the signed source code 122 via the network 105 to the UAT system 130. In some examples, the TEST system 120 can send a link (e.g., a URL, a URI, a URN, or another suitable identifier) of the signed source code 122 via the network 105 to the UAT system 130, where the link indicates a location where the signed source code 122 is stored (e.g., in a database, a site, or a server). The TEST system 120 can check the signed source code 122 into the UAT system 130 by sending an indicator or flag along with the signed source code 122 indicating that the source code 122 is ready for testing by the UAT system 130.

In response to at least one of: determining that the source code 122 is ready to be code-signed, determining that testing and modifying the source code 122 in the TEST environment is successful or completed, triggering the code-sign function 124, completing the code sign function 124, checking the signed source code 122 into the UAT system 130, or providing the signed source code 122 to the UAT system 130, a TEST timestamp event is triggered. In the TEST timestamp event, a TEST timestamp 128 is generated to correspond to the signed source code 122 exiting the TEST system 120 and/or entering the UAT system 130. The CSCC system 102 can add the TEST timestamp 128 onto the CSCC blockchain 160.

In some arrangements, the TEST timestamp 128 is a trusted timestamp such as a TST. In some arrangements, a requestor (e.g., the TEST system 120, the CSCC system 102, or another suitable device or system) sends a hash of the source code 122 to a TSA and receives the TST for the source code 122 from the TSA. The source code 122 to be hashed can include the source code 122 without the signature of the TEST system 120 in some examples. That is, the source code 122 without the signature of the TEST system 120 is hashed for generating the TEST timestamp 128. In other examples, the source code 122 to be hashed can include the source code 122 with the signature of the TEST system 120 to provide code integrity and authenticity provable to a trusted time. That is, the source code 122 with the signature of the TEST system 120 is hashed for generating the TEST timestamp 128. The requestor can send to the TSA the hashed source code 122 (signed or unsigned) or a link to the hashed source code 122 (signed or unsigned) that is stored in a database, a site, a server, or the cloud. In the examples in which the TEST system 120 (e.g., the requestor) receives the TEST timestamp 128 (e.g., the TST) from the TSA, the TEST system 120 sends the TEST timestamp 128 to the CSCC system 102 for including in the blockchain 160. In some examples in which the CSCC system 102 is the requestor, the CSCC system 102 receives the TEST timestamp 128 (e.g., the TST) from the TSA directly.

The requestor can send the hash of the source code 122 (without the signature of the TEST system 120) in response to at least one of: determining that the source code 122 is ready to be code-signed, determining that testing and modifying the source code 122 in the TEST environment is successful or completed, triggering the code-sign function 124, completing the code sign function 124, checking the signed source code 122 into the UAT system 130, or providing the signed source code 122 to the UAT system 130. The requestor can send the hash of the source code 122 (with the signature of the DEV system 110) in response to at least one of: completing the code sign function 124, checking the signed source code 122 into the UAT system 130, or providing the signed source code 122 to the UAT system 130.

The TSA can generate the TST by running the hashed source code 122 (with or without the signature of the TEST system 120) through a TST function. The TSA does not have access to the original the source code 122. The TST function can create a TST by appending a timestamp from a calibrated clock to the respective hashed content of the source code 122 and generating a cryptographic signature, such as a digital signature, a MAC, an HMAC, or a hash chain over the timestamp appended to the hashed content of the source code 122. The cryptographic signature can be verified by a relying party to determine integrity provable to a trusted time indicated by the TST. In some examples, the TST can be generated using one or more TST mechanisms including 1) Digital Signature Method, 2) MAC Method, 3) Linked Token Method, 4) Linked and Signed Method, and 5) Transient Key Method.

The UAT system 130 is operated by a tester to compile the source code 122, test the source code 122, and modify the source code 122 based on the test rest results. The tests performed by the UAT system 130 may have at least one parameter be defined by the tester (e.g., using the input/output circuit 235). In some examples, the tests performed by the UAT system 130 can be automated using software (e.g., an automated regression tests) or based on AI. The tester for the UAT system 130 is different from the tester of the TEST system 120. The modified version of the source code 122 is referred to as source code 132, which may be a third version or variation of the source code 112.

The UAT system 130 can validate the signed source code 122 outputted by or received from the TEST system 120. The signed source code 122 is authenticated by rehashing the source code 122 and using the corresponding asymmetric public key of the TEST system 120 (or an operator thereof) to verify the digital signature over the signed source code 122. The public key is encapsulated in a certificate 126 (e.g., an X.509 public key certificate) of the TEST system 120 (or an operator thereof), issued from a trusted CA. The certificate 126 is validated (e.g., using public key certificate chain validation) before its public key can be trusted to authenticate the signature on the signed source code 122. The certificate chain of the certificate 126 can include at least the certificate 126, the CA certificate, and the root certificate. The CA can be a private PKI (e.g., for a given entity or company) or a public PKI (e.g., DigiCert). In response to validating the certificate 126, the public key included in the certificate 126 can be used to verify the signature over the signed source code 122. In response to verifying the signature over the signed source code 122, the source code 122 can be used as input code to the UAT system 130, which compiles the source code 122 and tests the source code 122 in a test environment. Based on the results of the test, the source code 132 is generated by the UAT system 130. For example, the test can use the input/output circuit 235 to input (e.g., write) modifications of the source code 122 to generate the source code 132 based on the test results.

In response to generating the source code 132, the source code 132 is submitted to the next environment and system, namely the PROD repository 140 managed by the PROD system 150. The PROD repository 140 can be any suitable database, server, cloud storage associated with, included in, or communicably coupled to the PROD system 150. The source code 132 is signed by the tester associated with the UAT system 130. For example, the source code 132 is run through a code sign function 134 to generate the signed source code 132. The code sign function 134 can be implemented using the code sign circuit 236 or by a central system, such as the code sign circuit 206 of the CSCC system 102. The code sign function 134 includes hashing the source code 132 and signing the hashed source code 132 using an asymmetric private key of the UAT system 130 or an operator thereof. Thus, a digital signature associated with the UAT system 130 or the UAT environment can be created over the hash of the source code 132. The UAT system 130 provides the signed source code 132 to the PROD repository 140 or the PROD system 150 for testing and modification. In some examples, the UAT system 130 can send the signed source code 132 via the network 105 to the PROD repository 140. In some examples, the UAT system 130 can send a link (e.g., a URL, a URI, a URN, or another suitable identifier) of the signed source code 132 via the network 105 to the PROD repository 140, where the link indicates a location where the signed source code 132 is stored (e.g., in a database, a site, or a server). The UAT system 130 can check the signed source code 132 into the PROD repository 140 by sending an indicator or flag along with the signed source code 132 indicating that the source code 132 is ready for compilation and release by the PROD system 150.

In response to at least one of: determining that the source code 132 is ready to be code-signed, determining that testing and modifying the source code 132 in the UAT environment is successful or completed, triggering the code-sign function 134, completing the code sign function 134, checking the signed source code 132 into the PROD repository 140 or the PROD system 150, or providing the signed source code 132 to the PROD repository 140 or the PROD system 150, a UAT timestamp event is triggered. In the UAT timestamp event, a UAT timestamp 138 is generated to correspond to the signed source code 132 exiting the UAT system 130, entering PROD system 150, and/or entering the PROD repository 140. The CSCC system 102 can add the UAT timestamp 138 onto the CSCC blockchain 160.

In some arrangements, the UAT timestamp 138 is a trusted timestamp such as a TST. In some arrangements, a requestor (e.g., the UAT system 130, the CSCC system 102, or another suitable device or system) sends a hash of the source code 132 to a TSA and receives the TST for the source code 132 from the TSA. The source code 132 to be hashed can include the source code 132 without the signature of the UAT system 130 in some examples. That is, the source code 132 without the signature of the UAT system 130 is hashed for generating the UAT timestamp 138. In other examples, the source code 132 to be hashed can include the source code 132 with the signature of the UAT system 130 to provide code integrity and authenticity provable to a trusted time. That is, the source code 132 with the signature of the UAT system 130 is hashed for generating the UAT timestamp 138. The requestor can send to the TSA the hash of the source code 132 (signed or unsigned) or a link to the hash of the source code 132 (signed or unsigned) that is stored in a database, a site, a server, or the cloud. In the examples in which the UAT system 130 (e.g., the requestor) receives the UAT timestamp 138 (e.g., the TST) from the TSA, the UAT system 130 sends the UAT timestamp 138 to the CSCC system 102 for including in the blockchain 160. In some examples in which the CSCC system 102 is the requestor, the CSCC system 102 receives the UAT timestamp 138 (e.g., the TST) from the TSA directly.

The requestor can send the hash of the source code 132 (without the signature of the UAT system 130) in response to at least one of: determining that the source code 132 is ready to be code-signed, determining that testing and modifying the source code 132 in the UAT environment is successful or completed, triggering the code-sign function 134, completing the code sign function 134, checking the signed source code 132 into the PROD repository 140 or the PROD system 150, or providing the signed source code 132 to the PROD repository 140 or the PROD system 150. The requestor can send the hash of the source code 132 (with the signature of the DEV system 110) in response to at least one of: completing the code sign function 134, checking the signed source code 132 into the PROD repository 140 or the PROD system 150, or providing the signed source code 132 to the PROD repository 140 or the PROD system 150.

The TSA can generate the TST by running the hashed source code 132 (with or without the signature of the UAT system 130) through a TST function. The TSA does not have access to the original content of the hashed source code 132. The TST function can create a TST by appending a timestamp from a calibrated clock to the respective hashed content of the source code 132 and generating a cryptographic signature, such as a digital signature, a MAC, an HMAC, or a hash chain over the timestamp appended to the hashed content of the source code 132. The cryptographic signature can be verified by a relying party to determine integrity provable to a trusted time indicated by the TST. In some examples, the TST can be generated using one or more TST mechanisms including 1) Digital Signature Method, 2) MAC Method, 3) Linked Token Method, 4) Linked and Signed Method, and 5) Transient Key Method.

The PROD system 150 is operated by an administrator to compile/assemble the source code 132 and deploy/release the compiled/assembled executable code 143. The compiled/assembled version of the source code 132 is referred to as executable code 143, which may be a fourth version or variation of the source code 112. The PROD system 150 can validate the signed source code 132 outputted by or received from the UAT system 130. The signed source code 132 is authenticated by rehashing the source code 132 and using the corresponding asymmetric public key of the UAT system 130 (or a tester thereof) to verify the digital signature over the signed source code 132. The public key is encapsulated in a certificate 136 (e.g., an X.509 public key certificate) of the UAT system 130 (or a tester thereof), issued from a trusted CA. The certificate 136 is validated (e.g., using public key certificate chain validation) before its public key can be trusted to authenticate the signature on the signed source code 132. The certificate chain of the certificate 136 can include at least the certificate 116, the CA certificate, and the root certificate. The CA can be a private PKI (e.g., for a given entity or company) or a public PKI (e.g., DigiCert). In response to validating the certificate 136, the public key included in the certificate 136 can be used to verify the signature over the signed source code 132.

In response to verifying the signature over the signed source code 132, the source code 132 can be used as input code to the PROD repository 140 (e.g., stored in the PROD repository 140) and/or inputted into the compile code function 142 managed by the PROD system 150 (e.g., the deployment circuit 245). The compile code function 142 compiles the input source code 132 stored in the PROD repository 140, which may be a readable source code, into the executable code 143 which is the compiled executable code.

In some arrangements, the PROD repository 140 can store various different code sets, each code set can be the source code 132 generated, tested, and compiled by the DEV system 110, the TEST system 120, the UAT system 130, and the PROD system 150 in the manner described. The different code sets can be assembled to form a single computer program, application, or product. In some examples, in the compile code function 142, the deployment circuit 245 compiles the code sets into compiled executable code sets, and the deployment circuit 245 can assemble various compiled code sets into the executable code 143 corresponding to the entire computer program, application, or product. In some examples, in the compile code function 142, the deployment circuit 245 assembles various readable source code sets into a single code set, and compiles the single code set into a single compiled executable code set, which is the executable code 143 corresponding to the entire computer program, application, or product. The assembling of various code sets can be performed in response to verifying the signature over each signed code (e.g., the signed source code 132) received from one or more UAT systems (each of which can be the UAT system such as the UAT system 130).

In response to obtaining the executable code 143 (e.g., by compiling the source code 132 and/or by assembling the code sets), the executable code 143 is signed by the administrator associated with the PROD system 150. For example, the executable code 143 is run through a code sign function 144 to generate the signed executable code 143. The code sign function 144 can be implemented using the code sign circuit 246 or by a central system, such as the code sign circuit 206 of the CSCC system 102. The code sign function 144 includes hashing the executable code 143 and signing the hashed executable code 143 using an asymmetric private key of the PROD system 150. Thus, a digital signature associated with the PROD system 150 or the PROD environment can be created over the hash of the executable code 143.

The PROD system 150 (e.g., the deployment circuit 245) can run the signed executable code 143 through the code release function 152, which releases and/or deploys the deployed executable code 143. The code release function 152 can perform one or more of releasing the signed executable code 143 to a platform or server for download (e.g., by the user system 104), releasing the signed executable code 143 to a platform or server for publication, pushing the signed executable code 143 to the user system 104 for installation via the network 105, and so on. The user system 104 can obtain the released and signed executable code 143 by retrieving or downloading the signed executable code 143 from the platform or server and installs the signed executable code 143 (e.g., the computer program, application, or product).

In response to at least one of: determining that the executable code 143 is ready to be code-signed, determining that the executable code 143 is successfully compiled or assembled, triggering the code-sign function 144, completing the code sign function 144, releasing the signed executable code 143 to be released, providing the signed executable code 143 to the code release function 152, or completing the code release function 152, a PROD timestamp event is triggered. In the PROD timestamp event, a PROD timestamp 148 is generated to correspond to the signed executable code 143 being compiled, assembled, released, or deployed. The CSCC system 102 can add the PROD timestamp 148 onto the CSCC blockchain 160.

In some arrangements, the PROD timestamp 148 is a trusted timestamp such as a TST. In some arrangements, a requestor (e.g., the PROD system 150, the CSCC system 102, or another suitable device or system) sends a hash of the executable code 143 to a TSA and receives the TST for the executable code 143 from the TSA. The executable code 143 to be hashed can include the executable code 143 without the signature of the PROD system 150 in some examples. That is, the executable code 143 without the signature of the PROD system 150 is hashed for generating the PROD timestamp 148. In other examples, the executable code 143 to be hashed can include the executable code 143 with the signature of the PROD system 150 to provide code integrity and authenticity provable to a trusted time. That is, the executable code 143 with the signature of the PROD system 150 is hashed for generating the PROD timestamp 148. The requestor can send to the TSA the hash of the executable code 143 (signed or unsigned) or a link to the hash of the executable code 143 (signed or unsigned) that is stored in a database, a site, a server, or the cloud. In the examples in which the PROD system 150 (e.g., the requestor) receives the PROD timestamp 148 (e.g., the TST) from the TSA, the PROD system 150 sends the PROD timestamp 148 to the CSCC system 102 for including in the blockchain 160. In some examples in which the CSCC system 102 is the requestor, the CSCC system 102 receives the PROD timestamp 148 (e.g., the TST) from the TSA directly.

The requestor can send the hash of the executable code 143 (without the signature of the PROD system 150) in response to at least one of: determining that the executable code 143 is ready to be code-signed, determining that the executable code 143 is successfully compiled or assembled, triggering the code-sign function 144, completing the code sign function 144, releasing the signed executable code 143 to be released, providing the signed executable code 143 to the code release function 152, completing the code release function 152. The requestor can send the hash of the executable code 143 (with the signature of the DEV system 110) in response to at least one of: completing the code sign function 144, releasing the signed executable code 143 to be released, providing the signed executable code 143 to the code release function 152, or completing the code release function 152.

The TSA can generate the TST by running the hashed executable code 143 (with or without the signature of the PROD system 150) through a TST function. The TSA does not have access to the original content of the hashed executable code 143. The TST function can create a TST by appending a timestamp from a calibrated clock to the respective hashed content of the executable code 143 and generating a cryptographic signature, such as a digital signature, a MAC, an HMAC, or a hash chain over the timestamp appended to the hashed content of the executable code 143. The cryptographic signature can be verified by a relying party to determine integrity provable to a trusted time indicated by the TST. In some examples, the TST can be generated using one or more TST mechanisms including 1) Digital Signature Method, 2) MAC Method, 3) Linked Token Method, 4) Linked and Signed Method, and 5) Transient Key Method.

In some arrangements, in response to the user system 104 obtaining the released code (e.g., the signed executable code 143), the user system 104 (e.g., the validation circuit 255) validates the signed executable code 143 released by the PROD system 150, e.g., at the code verify function 154. In some arrangements, in response to at least one of restarting the user system 104, reading the executable code 143 into memory for execution, or the user system 104 running, installing, or executing the executable code 143, the user system 104 (e.g., the validation circuit 255) validates the signed executable code 143 e.g., at the code verify function 154.

The code verify function 154 includes validating the certificate 146 of the PROD system 150 and using the public key encapsulated in the certificate 146 to verify the signature on the executable code 143. For example, the signed executable code 143 is authenticated by rehashing the executable code 143 and using the corresponding asymmetric public key of the PROD system 150 (or an administrator thereof) to verify the digital signature over the signed executable code 143. The public key is encapsulated in a certificate 146 (e.g., an X.509 public key certificate) of the PROD system 150 (or an administrator thereof), issued from a trusted CA. The certificate 146 is validated (e.g., using certificate chain validation) before its public key can be trusted to authenticate the signature on the signed executable code 143. The CA can be a private PKI (e.g., for a given entity or company) or a public PKI (e.g., DigiCert). For example, the certificate chain validation involves the certificate chain including the public key certificate 146 of the PROD system 150, a CA certificate 156 of the CA which issued the certificate 146, and a root certificate 158. The certificate chain can include additional intermediate certificates in addition to the certificates 156, 146, and 158. In response to validating the public key certificate 146, the validation circuit 255 uses the public key included in the public key certificate 146 to verify the signature on the signed executable code 143. Upon verifying the signature of the PROD system 150, the executable code 143 can be read, run, installed, or executed by the processing circuit 351 of the user system 104.

In some arrangements, instead of the TEST system 120 modifying the input source code 112, the TEST system 120 can transmit the test results (e.g., bugs, errors, debugging log, and so on) to the DEV system 110. The coder of the DEV system 110 can use the input/output circuit 215 to input (e.g., write) modifications to the source code 112. The modified source code 112 can be code signed using the code sign function 114 in the manner described, and the signed, revised source code 112 is provided to the TEST system 120 for further testing. In the arrangements which the modifications to the source code 112 is performed by the DEV system 110 and the testing is performed by the TEST system 120, multiple iterations (each of which involves the TEST system 120 providing the test results to the DEV system 110 and the DEV system 110 providing the signed, modified source code 112 back to the TEST system 120) can be performed. The source code 122 to be code signed in such arrangements can be a version of the source code 112 that has passed the testing by the TEST system 120.

In some arrangements, instead of the UAT system 130 modifying the input source code 122, the UAT system 130 can transmit the test results (e.g., bugs, errors, debugging log, and so on) to the DEV system 110. The coder of the DEV system 110 can use the input/output circuit 215 to input (e.g., write) modifications to the source code 112. The modified source code 112 can be code signed using the code sign function 114 in the manner described, and the signed, revised source code 112 is provided to the TEST system 120 and then the UAT system 130 for further testing in the manner described. In the arrangements which the modifications to the source code 112 is performed by the DEV system 110 and the testing is performed by the UAT system 130, multiple iterations (each of which involves the UAT system 130 providing the test results to the DEV system 110 and the DEV system 110 providing the signed, modified source code 112 back to the TEST system 120, which then provides the modified source code 122 back to the UAT system 130) can be performed. The source code 132 to be code signed in such arrangements can be a version of the source code 122 that has passed the testing by the UAT system 130.

In such arrangements, each time the DEV system 110 completes code generation or modification and is ready to check the source code 112 into the TEST system 120, the DEV timestamp 118 is generated and added to the CSCC blockchain 160 in the manner described. Accordingly, for the deployed code, there may be multiple DEV timestamps 118 in the blockchain 160. In such arrangements, each time TEST system 120 completes testing of the input source code 112 received from the DEV system 110 and is ready to check the output source code 122 into the UAT system 130, the TEST timestamp 128 is generated and added the CSCC blockchain 160 in the manner described. Accordingly, for the deployed code, there may be multiple TEST timestamps 128 in the blockchain 160. In such arrangements, each time UAT system 130 completes testing of the input source code 122 received from the TEST system 120 and is ready to check the output source code 132 into the PROD system 150 (e.g., the PROD repository 140), the UAT timestamp 138 is generated and added the CSCC blockchain 160 in the manner described. Accordingly, for the deployed code, there may be multiple UAT timestamps 138 in the blockchain 160.

In some arrangements, each time the user system 104 runs the code verify function 154, the user system 104 records a log entry on a log. In some examples, the log containing at least one entry can be provided to the PROD system 150 periodically or in response to generation of each log entry. In some examples, the log containing at least one entry can be provided to a messaging system periodically or in response to generation of each log entry, and the messaging system provides the log to the PROD system 150. In response to receiving the log, the log is signed by the administrator associated with the PROD system 150. For example, the log is run through the code sign function 144 to generate the signed log. The code sign function 144 can be implemented using the code sign circuit 246 or by a central system, such as the code sign circuit 206 of the CSCC system 102. The code sign function 144 includes hashing the log and signing the hashed log using an asymmetric private key of the PROD system 150. Thus, a digital signature associated with the PROD system 150 or the PROD environment can be created over the hash of the log.

In response to at least one of: receiving the log from the user system 104 or from a messaging system, determining that the log is ready to be code-signed, triggering the code-sign function 144, completing the code sign function 144, a PROD timestamp event is triggered. In the PROD timestamp event, a PROD timestamp is generated to correspond to the signed log. The CSCC system 102 can add the PROD timestamp corresponding to the log onto the CSCC blockchain 160.

In some arrangements, such the PROD timestamp generated for the log is a trusted timestamp such as a TST. In some arrangements, a requestor (e.g., the PROD system 150, the CSCC system 102, or another suitable device or system) sends a hash of the log to a TSA and receives the TST for the log from the TSA. The requestor can send to the TSA the hash of the log or a link to the log that is stored in a database, a site, a server, or the cloud. In the examples in which the PROD system 150 (e.g., the requestor) receives the PROD timestamp (e.g., the TST) from the TSA, the PROD system 150 sends the PROD timestamp to the CSCC system 102 for including in the blockchain 160. In some examples in which the CSCC system 102 is the requestor, the CSCC system 102 receives the PROD timestamp (e.g., the TST) from the TSA directly.

The CSCC blockchain 160 therefore holds timestamps for every stage of development and testing of the code making up the computer program and product, evidencing the chain of custody of the code. The information contained in the CSCC blockchain 160 can be read for audit purposes.

Figure 3:
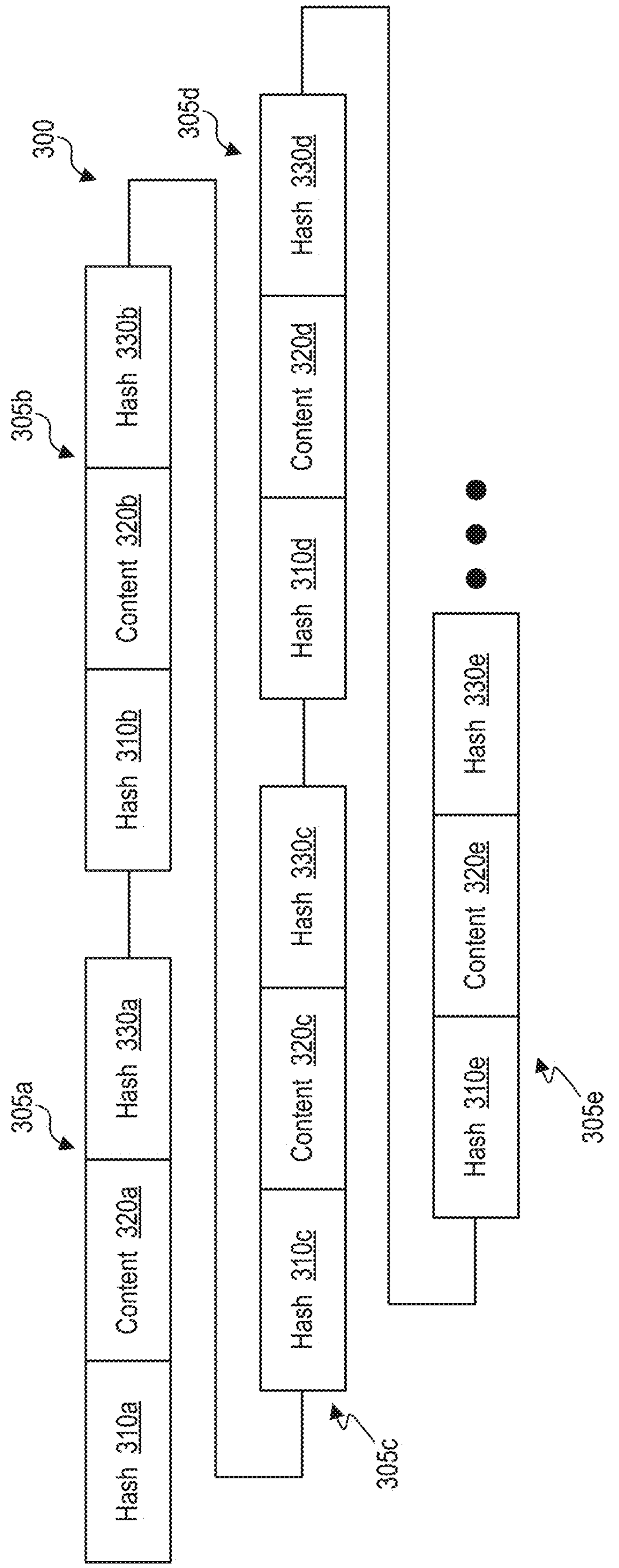
FIG. 3 is a block diagram illustrating an example CSCC blockchain, according to various arrangements.

FIG. 3 is a block diagram illustrating an example CSCC blockchain 300, according to various arrangements. The blockchain 300 can be an example of the blockchain 160. The CSCC system 102 can publish the timestamps 118, 128, 138, and 148 and associated information to the blockchain 300. The blockchain 300 is a chain of data blocks (e.g., data blocks 305*a*, 305*b*, 305*c*, 305*d*, and 305*e*) linked together using a cryptographic hash. The block 305*a* is the first block of the blockchain 300. The block 305*b* is the next block following the block 305*a*. The block 305*c* is the next block following block 305*b*. The block 305*d* is the next block following block 305*c*. The block 305*e* is the next block following block 305*d*, and so on. Each of blocks 305*a*, 305*b*, 305*c*, 305*d*, and 305*e* includes a link hash (e.g., a respective one of the hashes 310*a*, 310*b*, 310*c*, 310*d*, and 310*e*) and data element (e.g., a respective one of the contents 320*a*, 320*b*, 320*c*, 320*d*, and 320*e*). A link hash is the hash of the previous block. Therefore, the hash 310*b* (e.g., hash (305*a*)) is the hash of the block 305*a*, the hash 310*c* (e.g., hash (305*b*)) is the hash of the block 305*b*, the hash 310*d* (e.g., hash (305*c*)) is the hash of the block 305*c*, the hash 310*e* (e.g., hash (305*d*)) is the hash of the block 305*d*, and so on. The hash 310*a* is null as there is no block before the block 305*a*. In other words, the first block 305*a* cannot point to a previous block as there is no previous block to hash. Thus, the hash 310*a* is either a null or hash (null). Accordingly, the block 305*a* can be in the format of [null, TST 320*a*, hash 320*a*]. The blockchain is considered immutable as any data change in any block, except for the block 305*e* will negate one or more hashes 310*b*, 310*c*, 310*d*, or 310*e*. For example, a change in content 320*a* will invalidate hash 310*b* and consequently hashes 310*c*, 310*d*, 310*e*, and so on.

In some examples, each of the blocks 305*a*, 305*b*, 305*c*, 305*d*, and 305*e* has, in addition to the respective one of the link hashes 310*a*, 310*b*, 310*c*, 310*d*, and 310*e*, an internal data hash (e.g., hashes 330*a*, 330*b*, 330*c*, 330*d*, and 330*e*) for the data element of the same block. For example, each of the blocks 305*a*, 305*b*, 305*c*, 305*d*, and 305*e* contains a hash (e.g., a respective one of the hashes 330*a*, 330*b*, 330*c*, 330*d*, and 330*e*) of its own data element (e.g., a respective one of the contents 320*a*, 320*b*, 320*c*, 320*d*, and 320*e*), which is consequently the hash of each block. The hash 330*a* has a format of hash (content 320*a*), the hash 330*b* has a format of hash (content 320*b*), the hash 330*c* has a format of hash (content 320*c*), the hash 330*d* has a format of hash (content 320*d*), and the hash 330*e* has a format of hash (content 320*e*). Thus, each of the link hashes 310*b*, 310*c*, 310*d*, and 310*e* is a hash of all three block elements (e.g., the link hash, the data element, and the data hash) of the previously block. The data hash allows verification of the data within a specific block without having to verify the entire blockchain. The immutability of the blockchain remains to be dependent on the link hash elements.

In some arrangement, each content 320*a*, 320*b*, 320*c*, 320*d*, or 320*e* includes a respective Code Sign Event Record (CSER). For example, the content 320*a* includes the DEV CSER (which includes the DEV timestamp 118), the content 320*b* includes the TEST CSER (which includes the TEST timestamp 128), the content 320*c* includes the UAT CSER (which includes the UAT timestamp 138), the content 320*d* includes the PROD CSER (which includes the CSER (which includes the PROD timestamp 148), and the content 320*e* includes the PROD CSER (which includes the PROD timestamp corresponding to a log having one or more entries generated in response to the code verify function 154 being run).

In some arrangements, in addition to the respective timestamp, each content 320*a*, 320*b*, 320*c*, 320*d*, or 320*e* (e.g., each CSER) includes additional information associated with the respective timestamp (which identifies a date and time). The additional information includes at least one of the name (e.g., title, identifier, or product name) of the code, a version identifier or version name of the code, the identifier or name of the developer/tester/administrator, the identifier or name of the system (e.g., 110, 120, 130, 150), a link to the code, the signature on the code, the certificate encapsulating the public key used to verify the signature, the identifier of a signer of the code, a hash of the code, and so on.

For example, the content 320*a* (e.g., the DEV CSER) can include one or more of the DEV timestamp 118, the name of the source code 112, the version identifier or version name of the source code 112, the identifier or name of the DEV system 110, the identifier or name of a developer operating the DEV system 110, a link to the source code 112 (without the signature of the DEV system 110), a link to the signed source code 112 (with the signature of the DEV system 110), the signature of the DEV system 110 on the signed source code 112, the certificate 116, and so on.

For example, the content 320*b* (e.g., the TEST CSER) can include one or more of the TEST timestamp 128, the name of the source code 122, the version identifier or version name of the source code 122, the identifier or name of the TEST system 120, the identifier or name of a tester operating the TEST system 120, a link to the source code 122 (without the signature of the TEST system 120), a link to the signed source code 122 (with the signature of the TEST system

120), the signature of the TEST system 120 on the signed source code 122, the certificate 126, and so on.

For example, the content 320*c* (e.g., the UAT CSER) can include one or more of the UAT timestamp 138, the name of the source code 132, the version identifier or version name of the source code 132, the identifier or name of the UAT system 130, the identifier or name of a tester operating the UAT system 130, a link to the source code 132 (without the signature of the UAT system 130), a link to the signed source code 132 (with the signature of the UAT system 130), the signature of the UAT system 130 on the signed source code 122, the certificate 136, and so on.

For example, the content 320*d* (e.g., the PROD CSER) can include one or more of the PROD timestamp 148, the name of the executable code 143, the version identifier or version name of the executable code 143, the identifier or name of the PROD system 150, the identifier or name of an administrator operating the PROD system 150, a link to the executable code 143 (without the signature of the PROD system 150), a link to the signed executable code 143 (with the signature of the PROD system 150), the signature of the PROD system 150 on the signed executable code 143, the certificate 146, and so on.

For example, the content 320*e* (e.g., the PROD CSER) can include one or more of the PROD timestamp generated for the log, the name of the log corresponding to the user system 104 running the code verify function 154, the version identifier or version name of the log, the identifier or name of the PROD system 150, the identifier or name of an administrator operating the PROD system 150, a link to the log (without the signature of the PROD system 150), a link to the log (with the signature of the PROD system 150), the signature of the PROD system 150 on the log, the certificate 146, and so on.

Each of the contents 320*a*, 320*b*, 320*c*, 320*d*, and 320*e* is accessible by a relying party (e.g., the user system 104 or another suitable audit device) via a link (e.g., a URL, URI, URN, or so on). The relying party can obtain the content 320*a*, 320*b*, 320*c*, 320*d*, or 320*e* and verify one or more of the timestamp (e.g., the TST) or the signature of the corresponding system (e.g., the system 110, 120, 130, or 150) in the manner described.

In some examples, the blockchain 160 includes blocks containing the signature on the code or log and does not contain the code or log itself. In some examples, a block in the blockchain 160 may include a link to the code or a link to the log, but not the code or log itself. In some examples, the blocks in the blockchain 160 may not include a link to the code or to the log, and may not include the code or log itself. In such examples, the signature is detached from the code or log, as the signature is located on the blockchain 160 while the code or log reside on a different system, network node, platform, or storage different from the blockchain 160.

In some examples, the PROD system 150 can compile and assemble codes (e.g., at the compile code function 142) stored in multiple PROD repositories 140. That is, different UAT systems 130 can each send a different portion of the code to-be-compiled to a different one of the multiple PROD repositories 140. The PROD system 150 can assemble the different portions of the code as described herein. In such examples, there are multiple certificates 136 for the different UAT systems 130 are needed to verify and validate the different portions of the code to-be-compiled. A CSWL can be implemented to manage the different certificate chains for the different certificates 136. CSWLs are described for example in U.S. Pat. No. 11,431,510, filed Apr. 30, 2020, titled "Code Sign White List (CSWL)," and U.S. Pat. No. 11,552,804, filed Jul. 17, 2020, titled "Code Sign White List (CSWL)," the contents of which are incorporated herein by reference in their entireties.

A CSWL can efficiently managing an executable environment involving multiple code-sign certificate chains. For example, a relying party (e.g., the PROD system 150) may retrieve a single CSWL from a trusted signer (e.g., the CSCC system 102 or another CSWL system) who digitally signs the CSWL with a digital signature of the trusted signer. The trusted signer also manages the executable environment (e.g., the PROD environment) by updating and maintaining the CSWL. The digital signature of the trusted signer is verified by the PROD system 150 using the trusted signer's code-sign certificate that is issued from a trusted CA. The CSWL is composed of the certificate chains needed to verify any of the code signatures, including the certificate chain for each of the certificates 136. The certificate chain for each certificate 136 includes at least the certificate 136, the CA certificate, and the root certificate. The certificate chains may be explicitly included in the list or implicitly refer to the certificates using a URL, URN, or URI, or other methods. As such, the executable environment only needs to manage the certificate chain for the CSWL. In some arrangements, the CSWL may include a timestamp, a version number, a Time-To-Live (TTL), and/or the next publication date. In some arrangements, the executable environment may download the CSWL periodically or on-demand as needed.

In some examples, the UAT system 130 can receive and test codes from multiple TEST systems 120. That is, different TEST systems 120 can each send a different code (e.g., the source code 122) to the UAT system 130. The UAT system 130 can test and sign the different codes (e.g., at the code sign function 134) as described herein. In such examples, there are multiple certificates 126 for the different TEST systems 120 are needed to verify and validate the different codes before compiling and testing. A CSWL can be implemented to manage the different certificate chains for the different certificates 126. For example, a relying party (e.g., the UAT system 130) may retrieve a single CSWL from a trusted signer (e.g., the CSCC system 102 or another CSWL system) who digitally signs the CSWL with a digital signature of the trusted signer. The trusted signer also manages the executable environment (e.g., the UAT environment) by updating and maintaining the CSWL. The digital signature of the trusted signer is verified by the UAT system 130 using the trusted signer's code-sign certificate that is issued from a trusted CA. The CSWL is composed of the certificate chains needed to verify any of the code signatures, including the certificate chain for each of the certificates 126. The certificate chain for each certificate 126 includes at least the certificate 126, the CA certificate, and the root certificate. The certificate chains may be explicitly included in the list or implicitly refer to the certificates using a URL, URN, or URI, or other methods. As such, the executable environment only needs to manage the certificate chain for the CSWL. In some arrangements, the CSWL may include a timestamp, a version number, a TTL, and/or the next publication date. In some arrangements, the executable environment may download the CSWL periodically or on-demand as needed.

In some examples, the TEST system 120 can receive and test codes from multiple DEV systems 110. That is, different DEV systems 110 can each send a different code (e.g., the source code 112) to the TEST system 120. The TEST system 120 can test and sign the different codes (e.g., at the code sign function 124) as described herein. In such examples, there are multiple certificates 116 for the different DEV systems 110 are needed to verify and validate the different codes before compiling and testing. A CSWL can be implemented to manage the different certificate chains for the different certificates 116. For example, a relying party (e.g., the TEST system 120) may retrieve a single CSWL from a trusted signer (e.g., the CSCC system 102 or another CSWL system) who digitally signs the CSWL with a digital signature of the trusted signer. The trusted signer also manages the executable environment (e.g., the UAT environment) by updating and maintaining the CSWL. The digital signature of the trusted signer is verified by the TEST system 120 using the trusted signer's code-sign certificate that is issued from a trusted CA. The CSWL is composed of the certificate chains needed to verify any of the code signatures, including the certificate chain for each of the certificates 116. The certificate chain for each certificate 116 includes at least the certificate 116, the CA certificate, and the root certificate. The certificate chains may be explicitly included in the list or implicitly refer to the certificates using a URL, URN, or URI, or other methods. As such, the executable environment only needs to manage the certificate chain for the CSWL. In some arrangements, the CSWL may include a timestamp, a version number, a TTL, and/or the next publication date. In some arrangements, the executable environment may download the CSWL periodically or on-demand as needed.

In some examples, a relying party computing system (e.g., the user system 104 or another audit system) can retrieve the content 320*a*, 320*b*, 320*c*, 320*d*, or 320*e* via the corresponding link provided to the relying party computing system by the CSCC system 102 via the network 105. The relying party computing system can verify the timestamp included in the content 320*a*, 320*b*, 320*c*, 320*d*, or 320*e* in some arrangements. In some arrangements, the relying party computing system can verify the signature over the corresponding code included in the content 320*a*, 320*b*, 320*c*, 320*d*, or 320*e*.

For example, the relying party computing system can verify the cryptographic signature (e.g., a digital signature, a MAC, a HMAC, or a hash chain) over the timestamp appended to the hashed code or hashed log to verify the TST. In some examples, given that the TST includes the hashed data (e.g., hashed code or hashed log) which is a hash of the original data (e.g., the code or the log), the relying party computing system (e.g., the validation circuit 255) can run the original data corresponding to each timestamp through the same hash function by which the hashed data is generated. If the hashed data generated is the same as the hashed data included in the TST, then TST is verified. In some examples, the relying party computing system retrieves a calibration record from the TSA to determine whether at the time noted by the timestamp in the TST a calibration for the hashed data has occurred at the TSA 103. In response to verifying the TST, the application circuit 142 can use the original data. On the other hand, in response to failing to verify the TST, the relying party computing system rejects the code.

The relying party computing system can authenticate any signed code (e.g., signed 112, 122, 132, 143) or the signed log which is included in the 320*a*, 320*b*, 320*c*, 320*d*, or 320*e* by rehashing the code or log and using the corresponding asymmetric public key of the system (e.g., the system 110, 120, 130, or 150) to verify the digital signature over the signed code or signed log. The public key is encapsulated in a certificate (e.g., the certificate 116, 126, 136, or 146) of the system, which is included in the content 320*a*, 320*b*, 320*c*, 320*d*, or 320*e*. The certificate is validated (e.g., using public key certificate chain validation) before its public key can be trusted to authenticate the signature on the signed code or signed log. In response to validating the certificate, the public key included in the certificate can be used to verify the signature over the signed code or signed log.

Figure 4:
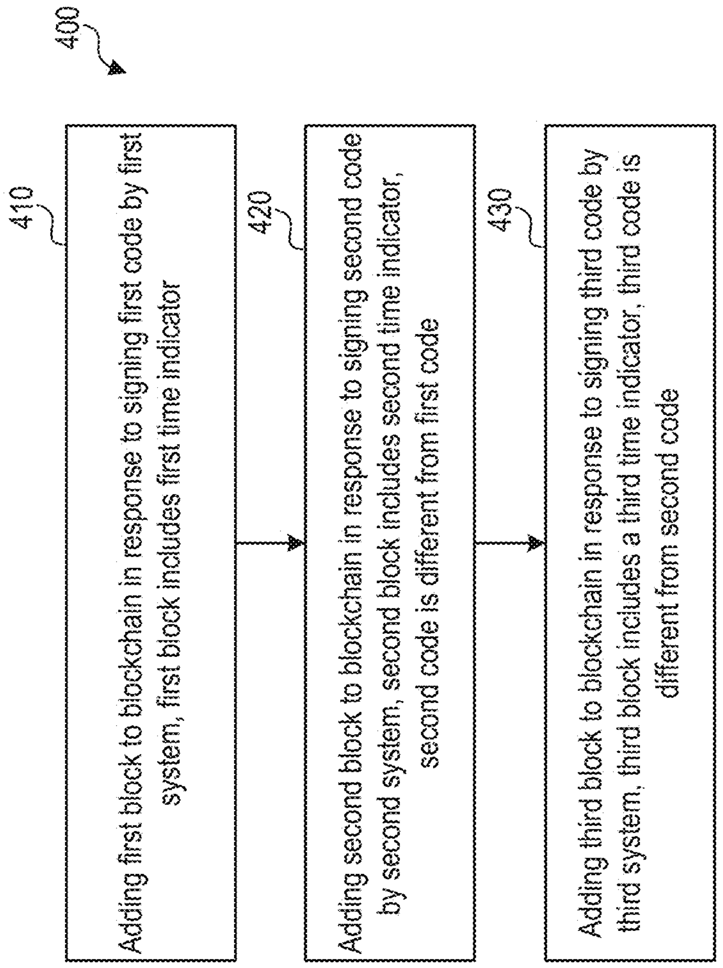
FIG. 4 is a flowchart diagram illustrating a method for providing CSCC for computer codes, according to some arrangements.

FIG. 4 is a flowchart diagram illustrating a method 400 for providing CSCC for computer codes, according to some arrangements. In the method 400, timestamps can be published on the CSCC blockchains 160 and 300 to provide end-to-end code integrity and authentication for different variations and versions of the code (e.g., the codes 112, 122, 132, 143, and so on) generated and modified in the development, testing, and release stages. The timestamps in the CSCC blockchain 160 include TST with hashing to provide end-to-end code integrity provable to a trusted time source. The CSWL can provide management of various PKI code-sign certificate chains. While the method 400 concerns computer code, other types of documents, files, or data such as an electronic document (e.g., an agreement, a financial document, and so on) can be likewise implemented. The method 400 can be implemented using the system 100.

At 410, the CSCC system 102 (e.g., the blockchain circuit 205) adds a first block to a blockchain (e.g., the blockchain 160 or 300) in response to signing first code by a first system. The first block can include a first time indicator (e.g., a first TST) associated with signing the first code.

At 420, the CSCC system 102 (e.g., the blockchain circuit 205) adds a second block to the blockchain in response to signing second code by second system, the second code is different (e.g., modified) from the first code. The second block can include a second time indicator (e.g., a second TST) associated with signing the second code.

In some arrangements, the second system verifies a first signature on the first code using a first public key of the first system. The first public key is encapsulated in a first public key certificate of the first system. In response to verifying the first signature, the second system performs at least one of testing the first code, compiling the first code, modifying the first code, or distributing the first code. In some examples, the first code is signed by the first system using a first private key of the first system. The first private key corresponds to the first public key. The second code is signed by the second system using a second private key of the second system.

In some arrangements, the first time indicator includes a first TST. The first TST includes a hash of the first code, a first timestamp, and a first cryptographic signature, without the first code. The second time indicator includes a second TST. The second TST includes a hash of the second code, a second timestamp, and a second cryptographic signature, without the second code. In some examples, the first TST is generated using a hash of the first code without a first signature of the first system. In some examples, the second TST is generated using a hash of the second code without a second signature of the second system. In some examples, the first TST is generated using a hash of the first code with a first signature of the first system. In some examples, the second TST is generated using a hash of the second code with a second signature of the second system.

In some arrangements, the first system includes the DEV system 110, the first block includes the DEV CSER, which includes the first time indicator for the DEV system (e.g., the DEV timestamp 118). The second system includes the TEST system 120, the second timestamp includes the TEST CSER, which includes the second time indicator for the TEST system (e.g., the TEST timestamp 128).

In some arrangements, the first system includes the TEST system 120, the first block includes the TEST CSER, which includes the first time indicator for the TEST system (e.g., the TEST timestamp 128). The second system includes the UAT system 130, the second timestamp includes the UAT CSER, which includes the second time indicator for the UAT system (e.g., the UAT timestamp 138).

At 430, the CSCC system 102 (e.g., the blockchain circuit 205) adds a third block to the blockchain in response to signing third code by a third system, the third block includes a third time indicator (e.g., a third TST) associated with signing the third code. The third code is compiled from the second code. In some examples, the second code includes a source code, and the third code includes a compiled executable code.

In some arrangements, the third system includes the PROD system 150, and the third block includes the PROD CSER, which includes the third time indicator for the PROD system (e.g., the PROD timestamp 148). In some examples, the user system 104 verifies a signature of the third system on the third code using a third public key of the third system. The third public key encapsulated in a third public key certificate (e.g., the certificate 146) of the third system.

In some arrangements, the third system verifies a second signature on the second code using a second public key of the second system, the second public key encapsulated in a second public key certificate (e.g., the certificate 136) of the second system (e.g., the UAT system 130). In response to verifying the second signature, the third system performs at least one of compiling the second code (e.g., the source code 132) to generate the third code (e.g., the executable code 143) or releasing the third code (e.g., the executable code 143).

In some arrangements, the second code includes a plurality of second codes (e.g., the codes 132), each of the plurality of second codes is signed by a different public key of a plurality of public keys, each different public key is encapsulated in a respective one of a plurality of public key certificates (e.g., the certificates 136). A CSWL comprises a certificate chain for each of the plurality of public key certificates. In response to the third system validating the certificate chain for each of the plurality of public key certificates, assembling the plurality of second codes and compiling the assembled plurality of second codes to generate the third code (e.g., the executable code 143). The plurality of second codes are checked into a plurality of repositories (e.g., the PROD repositories 140) by the second system (e.g., the UAT system 130).

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

adding a first block to a blockchain in response to signing a first code by a first system, wherein the first block comprises a first time indicator;

adding a second block to the blockchain in response to signing a second code by a second system, wherein the second block comprises a second time indicator, wherein the second code is different from the first code, wherein the second code comprises a plurality of second codes, wherein each of the plurality of second codes is signed by a different public key of a plurality of public keys, wherein each different public key is encapsulated in a respective one of a plurality of public key certificates, and wherein a Code Sign White List (CSWL) comprises a certificate chain for each of the plurality of public key certificates;

in response to a third system validating the certificate chain for each of the plurality of public key certificates, assembling the plurality of second codes and compiling the assembled plurality of second codes to generate a third code; and adding a third block to the blockchain in response to signing the third code by the third system, wherein the third block comprises a third time indicator, wherein the third code is different from the second code.

2. The method of claim 1, wherein the second system verifies a first signature on the first code using a first public key of the first system, wherein the first public key is encapsulated in a first public key certificate of the first system; and in response to verifying the first signature, the second system performs at least one of: testing the first code, compiling the first code, modifying the first code, or distributing the first code.

3. The method of claim 2, wherein the first code is signed by the first system using a first private key of the first system, wherein the first private key corresponds to the first public key; and the second code is signed by the second system using a second private key of the second system.

4. The method of claim 1, wherein the first time indicator comprises a first Time Stamp Token (TST);

the first TST comprises a hash of the first code, a first timestamp, and a first cryptographic signature, without the first code;

the second time indicator comprises a second TST; and the second TST comprises a hash of the second code, a second timestamp, and a second cryptographic signature, without the second code.

5. The method of claim 4, wherein at least one of:

the first TST is generated using a hash of the first code without a first signature of the first system; or the second TST is generated using a hash of the second code without a second signature of the second system.

6. The method of claim 4, wherein at least one of:

the first TST is generated using a hash of the first code with a first signature of the first system; or the second TST is generated using a hash of the second code with a second signature of the second system.

7. The method of claim 1, wherein the first system comprises a Development (DEV) system, wherein the first block comprises a DEV Code Sign Event Record (CSER), the DEV CSER comprises the first time indicator for the DEV system; and the second system comprises a TEST system, wherein the second block comprises a TEST CSER.

8. The method of claim 1, wherein the first system comprises a TEST system, wherein the first block comprises a TEST Code Sign Event Record (CSER), the TEST CSER comprises the first time indicator for the TEST system; and the second system comprises a User Acceptance Test (UAT) system, wherein the second time indicator comprises a UAT timestamp.

9. The method of claim 1, wherein the second code comprises source code, and the third code comprises compiled executable code.

10. The method of claim 1, wherein the third system comprises a Production (PROD) system, wherein the third time indicator comprises a PROD timestamp.

11. The method of claim 1, wherein a user system verifies a signature of the third system on the third code using a third public key of the third system and the third public key is encapsulated in a third public key certificate of the third system.

12. The method of claim 1, wherein the third system verifies a second signature on the second code using a second public key of the second system, wherein the second public key is encapsulated in a second public key certificate of the second system; and in response to verifying the second signature, the third system performs at least one of: compiling the second code to generate the third code or releasing the third code.

13. The method of claim 1, wherein the plurality of second codes are checked into a plurality of repositories by the second system.

14. A system, comprising:

a processing circuit comprising a processor and a memory, the processing circuit configured to:

add a first block to a blockchain in response to signing of a first code by a first system, wherein the first block comprises a first time indicator;

add a second block to the blockchain in response to signing of a second code by a second system, wherein the second block comprises a second time indicator, wherein the second code is different from the first code, wherein the second code comprises a plurality of second codes, wherein each of the plurality of second codes is signed by a different public key of a plurality of public keys, wherein each different public key is encapsulated in a respective one of a plurality of public key certificates, and wherein a Code Sign White List (CSWL) comprises a certificate chain for each of the plurality of public key certificates;

in response to a third system validating the certificate chain for each of the plurality of public key certificates, assemble the plurality of second codes and compiling the assembled plurality of second codes to generate a third code; and add a third block to the blockchain in response to signing of the third code by the third system, wherein the third block comprises a third time indicator, wherein the third code is different from the second code.

15. The system of claim 14, wherein the second system verifies a first signature on the first code using a first public key of the first system, wherein the first public key is encapsulated in a first public key certificate of the first system; and in response to verifying the first signature, the second system performs at least one of: testing the first code, compiling the first code, modifying the first code, or distributing the first code.

16. The system of claim 15, wherein the first code is signed by the first system using a first private key of the first system, wherein the first private key corresponds to the first public key; and the second code is signed by the second system using a second private key of the second system.

17. A non-transitory computer-readable medium comprising processor-readable instructions such that, when executed causes a processor to:

add a first block to a blockchain in response to signing a first code by a first system, wherein the first block comprises a first time indicator;

add a second block to the blockchain in response to signing a second code by a second system, wherein the second block comprises a second time indicator, wherein the second code is different from the first code, wherein the second code comprises a plurality of second codes, wherein each of the plurality of second codes is signed by a different public key of a plurality of public keys, wherein each different public key is encapsulated in a respective one of a plurality of public key certificates, and wherein a Code Sign White List (CSWL) comprises a certificate chain for each of the plurality of public key certificates;

in response to a third system validating the certificate chain for each of the plurality of public key certificates, assemble the plurality of second codes and compiling the assembled plurality of second codes to generate a third code; and add a third block to the blockchain in response to signing the third code by the third system, wherein the third block comprises a third time indicator, wherein the third code is different from the second code.

* * * * *